US006555814B1

(12) United States Patent
Baykut et al.

(10) Patent No.: US 6,555,814 B1
(45) Date of Patent: Apr. 29, 2003

(54) METHOD AND DEVICE FOR CONTROLLING THE NUMBER OF IONS IN ION CYCLOTRON RESONANCE MASS SPECTROMETERS

(75) Inventors: Gökhan Baykut, Bremen (DE); Jochen Franzen, Bremen (DE)

(73) Assignee: Brucker Daltonik GmbH, Breman (DE)

( * ) Notice: Subject to any disclaimer, the term of this patent is extended or adjusted under 35 U.S.C. 154(b) by 361 days.

(21) Appl. No.: 09/607,774

(22) Filed: Jun. 30, 2000

(30) Foreign Application Priority Data

Jul. 5, 1999 (DE) ........................................ 199 30 894

(51) Int. Cl.[7] ................................................ B01D 59/44
(52) U.S. Cl. ........................................ 250/288; 250/282
(58) Field of Search ......................... 250/291, 282–283, 250/288

(56) References Cited

U.S. PATENT DOCUMENTS

| | | | | |
|---|---|---|---|---|
| 5,572,022 A | | 11/1996 | Schwartz et al. | |
| 5,572,035 A | * | 11/1996 | Franzen | 250/396 |
| 5,708,268 A | * | 1/1998 | Franzen | 250/292 |
| 5,739,530 A | * | 4/1998 | Franzen et al. | 250/288 |
| 6,011,259 A | | 1/2000 | Whitehouse et al. | |

FOREIGN PATENT DOCUMENTS

| | | |
|---|---|---|
| DE | 33 31 136 C2 | 3/1985 |
| DE | 37 33 853 C2 | 4/1989 |

(List continued on next page.)

OTHER PUBLICATIONS

Eugene J. Zaluzec et al.; Review, Matrix–Assisted Laser Desorption Ionization Mass Spectrometry: Applications in Peptide and Protein Characterization; Protein Expression and Purification 6, (1995) pp. 109–123.

Paul Kebarie et al.; From Ions in Solution to Ions in the Gas Phase: The Mechanism of Electrospray Mass Spectrometry; Analytical Chemistry, vol. 65, No. 22, Nov. 15, 1993; pp. 972 A–986 A.

H.J. Rader et al.; Maldi–Top Mass Spectrometry In The Analysis of Synthetic Polymers; Aeta Polymer, 49, (1998) pp. 272–292.

(List continued on next page.)

*Primary Examiner*—John R. Lee
*Assistant Examiner*—Christopher M. Kalivoda

(57) ABSTRACT

The invention relates to a method and a device for controlling the number of ions in ion cyclotron resonance (ICR) mass spectrometers, whereby the ions enter a multipole ion guide after their formation and are stored there temporarily. By measuring the ion number in a predefined subset of these temporarily stored ions, the number of ions transferred into the ICR trap for mass spectrometric analysis is regulated. A mode of operation of the multipole ion guide can ensure that undesirable mass ranges are filtered out before the transfer of ions into the ICR mass spectrometer. The invention makes it possible to eliminate space charge effects, which are caused by overfilling the ICR traps.

20 Claims, 5 Drawing Sheets

FOREIGN PATENT DOCUMENTS

| | | | |
|---|---|---|---|
| DE | 195 20 319 | A1 | 12/1996 |
| DE | 195 23 859 | A1 | 1/1997 |
| DE | 195 23 860 | A1 | 1/1997 |
| DE | 196 17 011 | A1 | 11/1997 |
| DE | 197 52 778 | A1 | 6/1999 |
| GB | 2263578 | A | 7/1993 |
| GB | 2301704 | A | 12/1996 |
| WO | WO 98/06481 | A | 2/1998 |

OTHER PUBLICATIONS

A.N. Krutchinsky et al.; Orthogonal Injection of Matrix–Assisted Laser Desorption/Ionization Ions into A Time–Of–Flight Spectrometer Through A Collisional Damping Interface; Rapid Commun. Mass. Spectrom. 12, (1998) pp. 508–518.

J.B. Jeffries et al.; Theory Of Space–Charge Shift of Ion Cyclotron Resonance Frequencies; International Journal of Mass Spectrometry and Ion Processes, 54; (1983); pp. 169–187.

Raymond E. March et al.; Fundamental of Ion Trap Mass Spectrometry; Practical Aspects of Ion Trap Mass Spectrometry, vol. 1; pp. 350–361.

Peter H. Dawson; Quadrupole Mass Spectrometry and its applications; Elsevier Scientific Publishing Company; 1976; pp. 18–35.

* cited by examiner

METHOD AND DEVICE FOR CONTROLLING THE NUMBER OF IONS IN ION CYCLOTRON RESONANCE MASS SPECTROMETERS

The invention relates to a method and a device for controlling the number of ions in ion cyclotron resonance (ICR) mass spectrometers, whereby the ions enter a multipole ion guide after their formation and are stored there temporarily. By measuring the ion number in a predefined subset of these temporarily stored ions, the number of ions transferred into the ICR trap for mass spectrometric analysis is regulated.

PRIOR ART

Conventional methods of ionizing the substances for mass spectrometric analysis such as electron impact, cannot be applied to large organic or biomolecules. These species can neither be transferred into the gas phase by thermal energy supply without being decomposed, nor can they be ionized by electron impact without being fragmented. Contemporary mass spectrometry very frequently uses electrospray or matrix assisted laser desorption ionization (MALDI), which offer much milder ionization conditions to the large molecules.

Electrospray ionization is probably the most frequently used ionization method for the large molecules. A review article about the mechanism of the electrospray ionization was published by P. Kebarle and L. Tang in "Analytical Chemistry" 65, 972A-986A (1993). Using this method ions are generated at atmospheric pressure under the influence of high voltage (3–6 kV) between an electrospray needle and a counter electrode. Although the spray process is often supported by a slow and fine adjustable syringe pump, the separation of the small charged droplets as a result of the high ion density on the liquid surface (Coulomb repulsion) is the primary driving force of the spray process. A "drying gas that flows in counter current to the flight of the charged droplets leads to the evaporation of the solvent (desolvation process) and thus to the reduction of the droplet radii. Due to the increasing Colulomb repulsion forces the ionized molecules are evaporated and often multiply protonated. These ions are transferred through a capillary through a multi-stage vacuum system and through a multipole ion guide into the mass spectrometer for measurement. Electrospray ionization at atmospheric pressure has dramatically simplified linking separation methods, such as liquid chromatography or capillary electrophoresis, directly to the mass spectrometry.

Laser desorption ionization (LDI) has long been used to successfully transfer large organic molecules into the gas phase and to ionize them. A special kind of LDI is the matrix assisted laser desorption ionization (MALDI). The review article by E. J. Zaluzec, D. A. Gage, J. T. Watson in Protein Expression and Purification 6,109–123 (1995) reports about MALDI applications for characterization of proteins and peptides. A MALDI paper by H. J. Räder and W. Schrepp about the analysis of synthetic polymers with the aid of time of flight mass spectrometry can be found in Acta Polymer. 49, 272–293 (1998).

In MALDI the analyte molecules are mixed with a so-called matrix. The molar ratio of the matrix to the analyte is usually 1:$10^2$ to 1:$10^4$. The energy of the laser beam is absorbed by the matrix molecules and transferred to the analyte molecules. The latter thus obtain the necessary energy to transition in the gas phase and become thereby partially ionized. The ionization mostly happens in form of a proton acceptance. Compounds that are used as matrix are mostly proton donors. In special cases, alkaline metal salts or silver salts can be used as additives in order to achieve a corresponding metal ion attachment.

In classical cases of MALDI time of flight mass spectrometry, ions are extracted out of the source region using a high voltage pulse and accelerated into the flight tube. Contrary to the MALDI time of flight mass spectrometry, in high RF ion traps (Paul traps) and electromagnetic ion traps (Penning traps, ion cyclotron resonance and Fourier transform ion cyclotron resonance mass spectrometry) one wants to generate low-energy ions, in order to be able to capture them in the corresponding ion trap without sustaining any losses. Consequently, ions are not accelerated to energies of several kilo electron volts.

In the low energy extraction of MALDI generated ions, the variation of excessive energy gets more evident and causes difficulties even during capturing these ions. It leads to a considerable fluctuation of the generated mass signals and therefore to irreproducible analytical results. A low voltage MALDI ion source is described by A. N. Krutchinsky, A. V. Loboda, V. L. Spicer, R. Dworschak, W. Ens, K. G. Standing in "Rapid Communications in Mass Spectrometry" 12, 508–518 (1998), where the ions are desorbed directly into a quadrupole. Since the ions are practically formed in the quadrupole they are efficiently captured. However, the ions are here not collected and trapped in the quadrupole. The quadrupole is here used solely as an ion guide in order to transfer ions into the time of flight mass spectrometer.

One of the important differences between ion trap mass spectrometry and ion transmission mass spectrometry is caused by the limited ion storage capacity of the ion traps. Overloading an ion trap is as undesirable as having insufficient number of ions. Methods for controlling the number of ions in RF traps are described in the patents U.S. Pat. No. 5,107,109, DE 43 26 549. These patents describe a controlled generation of ions by electron impact in the trap by regulating the ionization time of the analyte molecules. In the first case the number of ions is determined by a premeasurement of the ion charge in the trap and regulated in the immediately following measurement. In the second patent, the actual value of the number of ions is extrapolated from integration of several of the preceding mass spectrometric measurements and used for the control. The patent U.S. Pat. No. 5,739,530 also describes a controlled ion filling from a multipole ion guide system to quadrupole ion traps.

The pulsed generation of ions by MALDI or LDI shows fundamental differences from ion formation in a continuous-operating ion source. In this case, the ionization is triggered by individual laser pulses, which transfer the small molecules in a crystalline (or liquid) matrix into the gas phase and ionize them in part. During every laser pulse the surface of the sample is also modified and rearranged, small cradles formed, while part of the matter is eroded from the surface. As a result the "ion picture" of the next laser pulse is not necessarily a reproduction of the one from the preceding pulse. That is, the number of ions transferred into the gas phase, as well as the intensity ratio of analyte ions to the matrix ions can vary significantly from laser pulse to laser pulse. Consequently, a varying space charge is caused in the trap.

The determination of the ion mass in the FTICR trap is performed by a frequency measurement. Due to the space charge in the trap, this frequency shifts. Therefore, a "reduced cyclotron frequency" is measured, which depends on the strength of the space charge. The publication of J. B. Jeffries, S. E. Barlow and G. H. Dunn, International Journal of Mass Spectrometry and Ion Processes 54, 169–187, (1983) describes these space charge mass shift effects theoretically. If the number of ions varies from scan to scan and are not regulated, this can cause each time a corresponding shift in the mass signal.

At high ion densities, another undesirable phenomenon appears, the so called "peak coalescence". Signals of ions with a very small mass difference, approach to each other and finally coalesce. The product of this coalescence is usually another sharp peak. In MALDIFTICR mass spectrometry peak coalescence phenomena are frequently observed due to uncontrolled number of ions which are transferred to the ICR trap.

If several scans have to be added up in order to increase the signal-to-noise ratio, these frequency shifts lead to problems. The varying number of ions of two consecutive ionization processes (e.g. MALDI) produces a varying space charge and varying mass shifts in each acquired spectrum. When adding up spectra, this effect presents itself as a peak broadening and thus leads to a loss of the mass resolution. Nowadays, the FTICR mass spectrometry is used largely because of its high mass accuracy and mass resolution. Therefore, even very small mass shifts caused by space charge effects mean a substantial loss in performance.

Although the difficulties with the variation of the mass spectrometric signal show up particularly during the ionization method MALDI, it is also observed during other ionization methods. The electrospray ionization also shows considerable fluctuations of ion formation. In addition, the electrospray technique allows coupling with chromatographic or electrophoretic separation methods, which in turn cause very strong time dependent concentration changes (in e.g. chromatographic peaks) and have also to be balanced out.

For this reasons it is evident that a control of the space charge in ICR traps is extremely important.

Objective of the Invention

It is the objective of the invention to develop a method and a device in order to avoid in ion trap mass spectrometers substantial ion number variations, which are caused by fluctuating generation of ions and the associated space charge effects.

SUMMARY OF THE INVENTION

The invention consists of capturing and storing the ions after their formation initially in a multipole ion guide and to store them there temporarily, measuring a predefined subset of these ions and subsequently, using the result of this measurement, controlling the ion cyclotron resonance trap filling process.

For temporarily storing the ions in the multipole ion guide system, it is necessary to apply reflection potentials to the beginning and to the end of the multipole ion guide system. This can be performed using apertured plates, while skimmers can also be considered as apertured plates. At the entrance end, the MALDI sample carrier plate can provide the potential for trapping the ions. The potential at the exit end must be switchable in order to be able to switch from storage mode to the extraction mode.

The filling of the ion trap from the ion guide depends on the number of ions in the ion guide, the so-called level of filling. In general, the filling rate depends on the level of filling. The storing multipole ion guide can consist of several individual multipole systems.

In the case of the ionization by MALDI, the temporary storage of the ions in the multipole ion guide has the additional advantage, that ions produced by several individual laser shots can be accumulated in the multipole guide and then transferred into the ion trap. On one hand, at insufficiently small analyte concentrations, the analyte ions can be enriched by using several laser shots. On the other hand, if there are too many ions produced, this can be established by the preliminary measurement, and considered during the ion trap filling process, in order to keep the space charge under control.

Another advantage of this method is that ions in the multipole ion guide lose their excess kinetic energy within a short time period by collisions with gas molecules if the multipole ion guide is in a section of the mass spectrometer with a slightly elevated pressure. As a result, the probability of capturing the ions in the ion trap mass spectrometer improves.

Furthermore, with the aid of the multipole ion guide undesirable ions can be filtered out before they are transferred to the ion trap for mass analysis. The presence of undesirable ions means nothing but additional space charge. Filtering ions in a multipole with rod-shaped electrodes is a well known process, each multipole has a low mass cutoff limit which only depends on electrical and mechanical parameters of the multipole.

DETAILED DESCRIPTION

Figure 1:
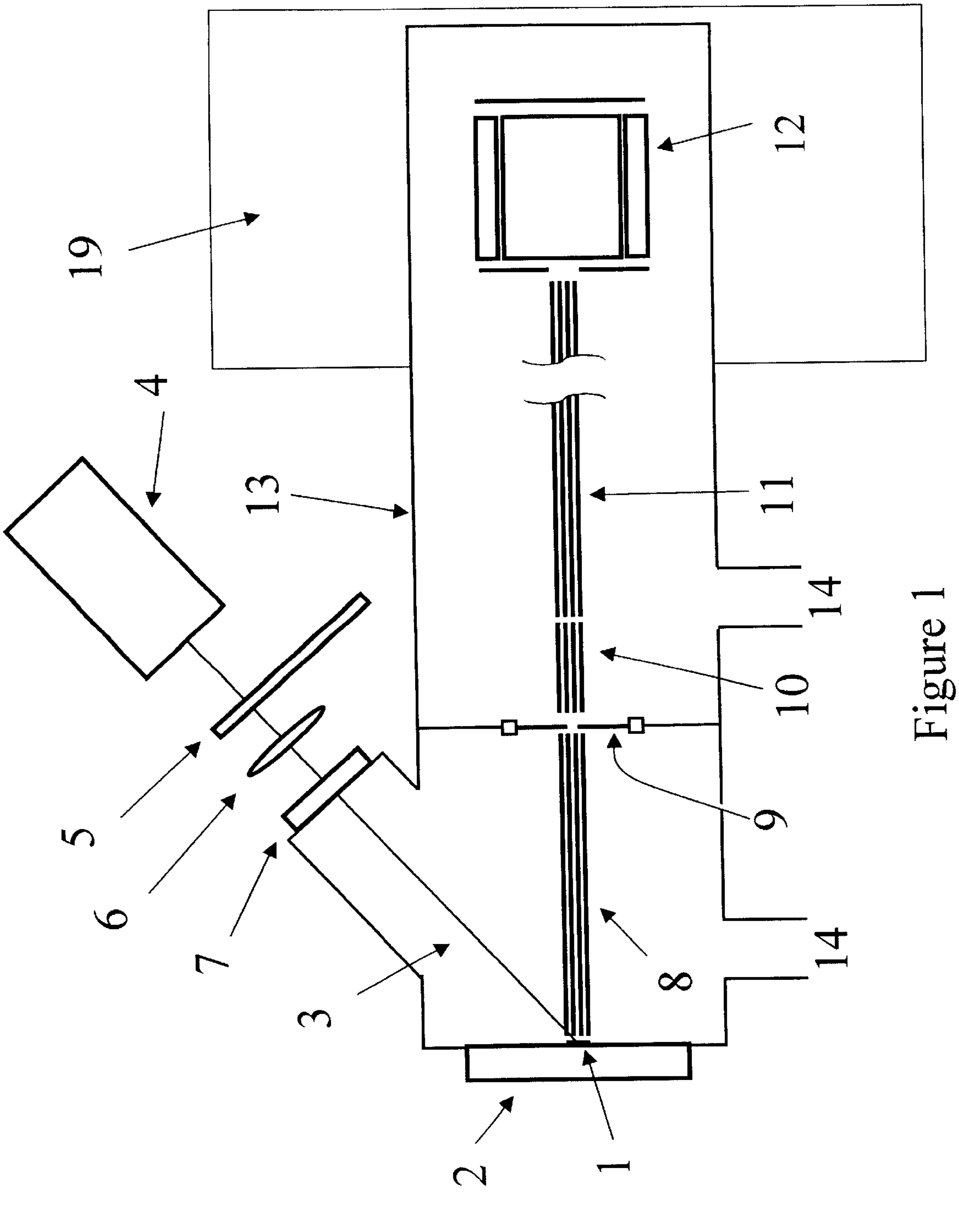
FIG. 1 describes a laser desorption ion source, where a multipole ion guide is placed directly in front of the sample carrier. Ions which are desorbed from the sample by laser irradiation directly enter the multipole ion guide and are temporarily stored there. A subset of these ions is extracted from the first multipole, which works as a trap, and transferred to the second multipole ion guide, which is temporarily operated as ion detector. This way, the number of temporarily stored ions is determined, and thus the decision is made how many of the remaining ions in the temporary storage will be transferred to the ICR trap for mass spectrometric analysis, or if new laser pulses are necessary to generate more ions.

FIG. 1 shows a MALDI source combined with an FTICR mass spectrometer. Ions are generated from the sample (1) on the sample carrier (2) by the beam (3) of the laser (4). In this arrangement the laser beam (3) passes through in an adjustable attenuator (5) a focusing lens (6) through the laser window (7) and hits the sample (1) in the vacuum system of the mass spectrometer. Ions generated in this way by laser desorption or by MALDI are received directly by the multipole ion guide (8).

The multipole ion guide in this example is an octopole and placed between the sample carrier plate (2) and an apertured plate (lens) (9), so that the multipole ion guide can be used as a multipole ion trap for temporary storage of ions. This apertured plate (9) is electrically insulated against the wall of the pumping stage. The electrical insulation is shown in FIG. 1 as small square shaped dots. If positive ions are desorbed during the LDI process, both the sample carrier plate (2) and the end plate (9) are at positive potentials (usually 5–20 Volt). Thus, the desorbed ions are kept in this multipole ion trap and stored there temporarily.

Ions that are desorbed with multiple successive laser shots can be accumulated in this linear multipole ion trap. After a certain storage time the stored ions are extracted out by applying a negative potential (usually 1–5 V) to the end plate (9) for a short period of time, after which they follow a path through two other multipole ion guides (10) and (11) (which are in this example octopoles) to the ion cyclotron resonance trap (12) placed in the vacuum system in the magnet (19). The vacuum system (13) consists of differentially pumped stages with separate pumping connections (14).

For regulating the number of ions, this arrangement is used as follows. A small subset of ions (approximately 5–10%) of the ions temporarily stored in the multipole ion trap (8) is transferred using a short pulse to the second short multipole ion guide (10), which is temporarily operating as an ion detector, and "pre-measured" there. Using this measurement, the number of the remaining ions in the multipole ion guide can be calculated. If this number is too large for a normal operation of the ICR trap, and if it can cause difficulties due to the space charge effects, only a certain amount of these ions will be transferred with the extraction pulse into the ICR trap and analyzed there. For the regular ion transfer process from source into the ICR trap, the multipole (10) is back to its normal operation mode as an ion guide. If the calculated number of the remaining temporarily stored ions is too small in order to obtain decent signal intensities, in this case further laser pulses are initiated and the whole procedure repeated until the ion number reaches a desired magnitude. Then the accumulated ions are transferred into he ICR trap.

The optimum ion number for the ICR trap must be known in order to apply this method.

A method based on the present invention can also be performed with the aid of a predetector. A part of the ions, which were temporarily stored in the multipole ion guide, is extracted using a short electrical pulse (a weak voltage is applied to the extraction plate of the multipole ion guide) and transferred to a predetector. The optimum length of this electric pulse is determined experimentally in such a way, that no more than 5–10% of the total number of ions in the temporary storage extracted. The purpose of the predetector is to convert this short ion pulse into an electrical current pulse, which indicates the "filling level" of the temporary storage. The filling time required for the transfer of the desired number of ions into the ion trap mass spectrometer is determined by a calibrating signal indicating the filling level of the temporary storage.

By predetecting a small subset of ions stored temporarily in the multipole guide, the system receives even before a mass spectrometric analysis the information, whether or not the quantity of ions will be sufficient to fill the ion trap optimally. The calibration of the system is performed using the correlation between the ions transferred into the ion trap with the ion signal from the predetector. The optimum number of ions in the trap can be determined considering the signal intensity and the extent of the frequency shift in the FTICR trap.

Another method based on the present invention is that the second multipole ion guide (10) in the system described in FIG. 1 is used as the predetector. For this, a subset of the prestored ions are extracted out of the first multipole ion guide and transferred in the second one. After the detection of the amount of ions the multipole is switched back into its original operation mode as an ion guide.

Figure 2:
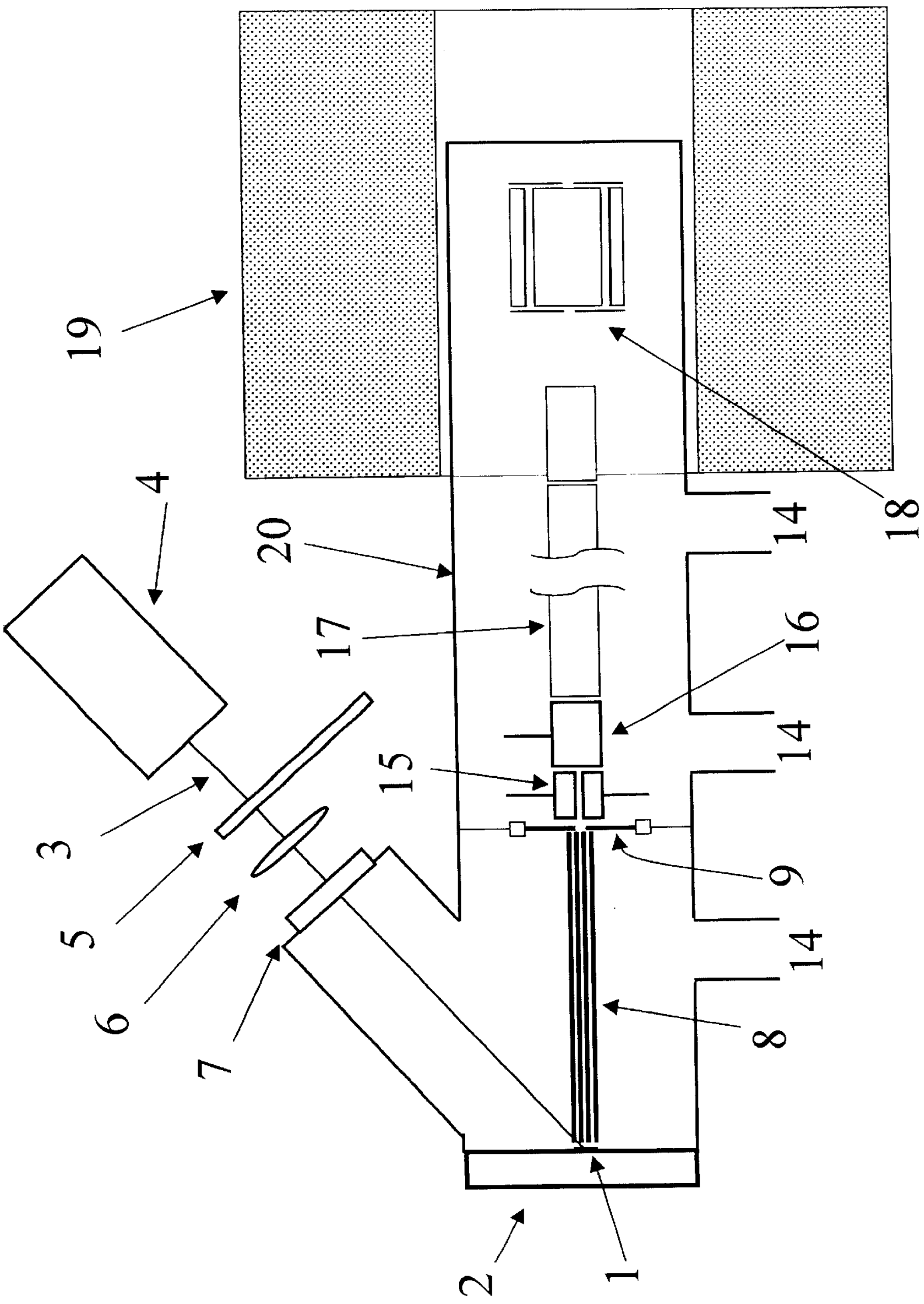
FIG. 2 describes an LDI source for an ICR mass spectrometer where a storing multipole ion guide is placed in front of the sample carrier. This ion source is equipped with a deflector and an ion detector for determining the number of the ions stored temporarily in the multipole ion guide.

FIG. 2 shows the same LDI source with a multipole ion guide, again connected to a Fourier transform ion cyclotron resonance mass spectrometer: Also in this setup, the laser beam (3) goes through an adjustable attenuator (5) a lens (6) for focussing and through the laser window (7) onto the sample (1) in the vacuum system of the mass spectrometer. Also here, the ions are generated from the sample (1) and temporarily stored in the ion guide (8). In this example the ion guide consists of an octopole. After a storage time in this multipole, by reversing the polarity of the voltage at the apertured lens (9), they are transferred through the ion optical lenses (15 and 16) into the ion transfer system (17) of the FTICR mass spectrometers. The ion transfer system in this example consists of several cylindrical ion-optical components, with the aid of which the ions are transferred into the ICR trap (18) in order to be detected mass spectrometrically. The ICR trap is located in a mass spectrometric vacuum system within a superconducting magnet (19). All pumping connections of the differentially pumped vacuum system (20) in the Figure have the number (14).

The pre-measurement for determining the number of the ions temporarily stored takes place as follows: A subset of temporarily stored ions is pulsed out of the multipole ion guide, and at the same time, a differential voltage is applied between the two halves of the lens (15). In this way, the ions are deflected to the side, whereupon they hit the wall of the cylindrical ion lens (16) which now operates as ion detector. The current measured here indicates the filling level (of the multipole ion guide) and is used to control the length of the extraction pulse at the extraction electrode (9).

The temporary storage of ions in the multipole ion trap naturally permits also to transfer a larger number of ions at once into the ICR trap, if this is necessary. For instance, in order to isolate only a certain type of ions in the ICR trap, an initial overfilling of the trap is necessary, Consequently, when all other ions are ejected (ion isolation experiment) this ion type will have an optimum number of ions in the ICR trap. By knowing the ionic distribution of the sample from a previous mass spectrum, the degree of the overfilling required for the process can be determined.

The temporary storage of the ions in the multipole ion guide allows during the storage time the transfer of the excess kinetic energy by collisions to the gas molecules in the environment and therefore leads to a cooling of the ions. The low energy ions can be transferred into the ICR trap and captured there much more successfully.

Depending on the pressure conditions prevailing in the LDI source, the end plate of the multipole ion guide can be built in form of a skimmer. This allows to create a differentially pumped system and have an higher pressure in the ion source than the rest of the mass spectrometric vacuum system.

A further method based on the present invention is, that for the pre-measurement of the ions, part of the ions stored in the multipole ion guide are pulsed past through the ICR trap, without being captured. These ions hit an ion detector behind the ICR trap and generate a reference signal for the filling level.

In the FTICR mass spectrometry a preprogrammed pulse sequence is used, whereby a so called quench pulse is applied in order to "clean" the trap before every ion generation pulse. A slightly higher voltage (−20 to −50 V) is applied on one of the trapping plates for a short time (usually 50 milliseconds), as a result of which the remaining positive ions fly to this plate and get neutralized. Negative ions fly with the same quench pulse to the other electrodes of the ICR trap and thus get also neutralized and eliminated. Based on this quench pulse accelerated method can be introduced for the pre-measurement: A subset of the ion temporarily stored in the multipole ion trap can be transferred into the ICR trap and using a quench pulse accelerated to one of the trapping plates, where they hit and generate an (electric) current, which serves as a filling level signal.

Figure 3:
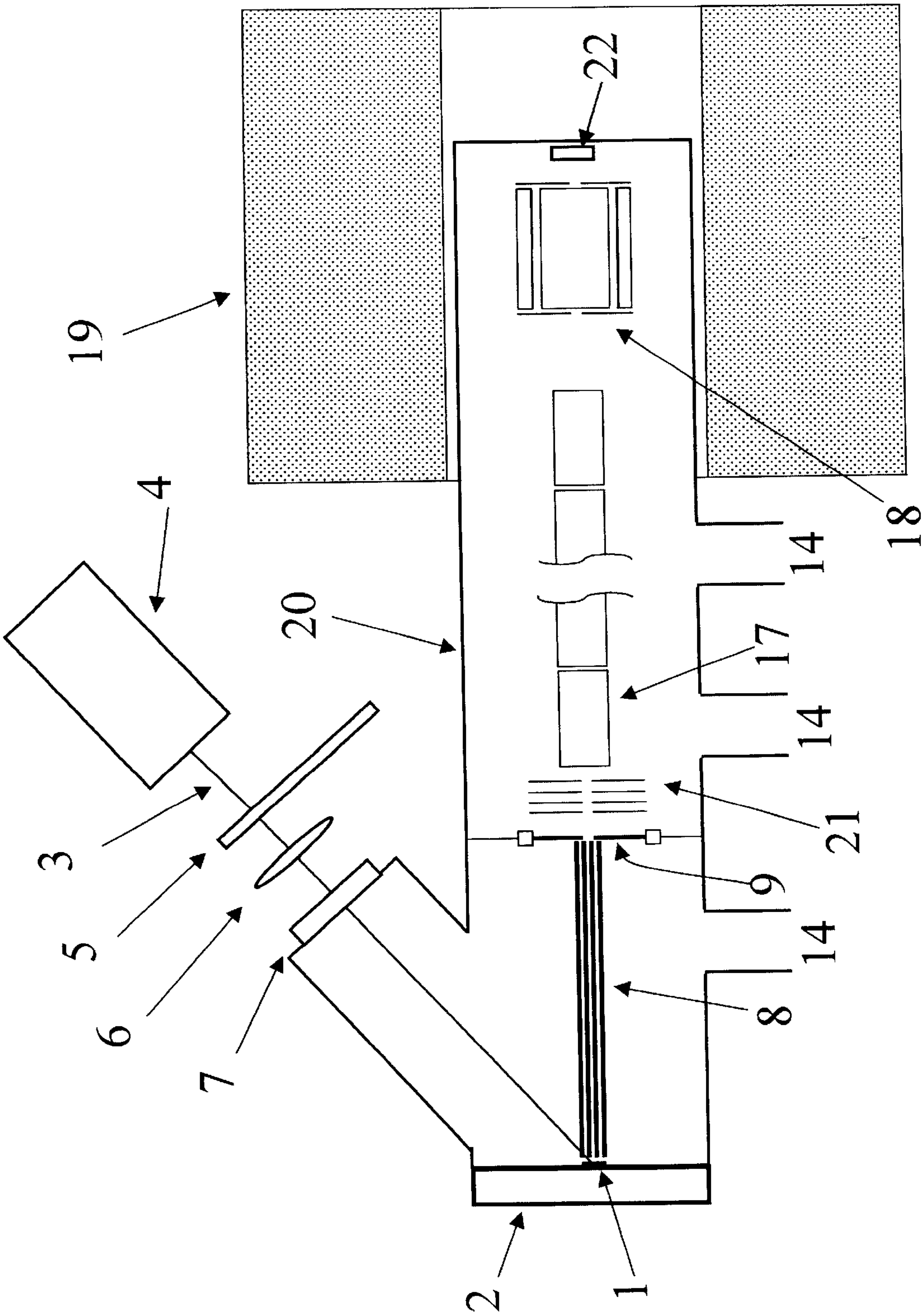
FIG. 3 describes an LDI source, where a storing multipole ion guide is placed in front of the sample carrier. Ions generated by laser irradiation directly enter the multipole and are stored there temporarily. Subsequently, a subset of these ions is extracted by applying a short pulsed potential to the apertured extraction electrode. In this arrangement, the ions fly all the way through the ICR trap and finally hit an ion detector for determining the number of ions stored temporarily (in the multipole) for the succeeding controlled filling the ICR trap.

FIG. 3 shows another setup for a pre-measurement of the amount of the ions stored in the multipole ion guide in an FTICR mass spectrometer with an ion detector behind the ICR trap.

In case of MALDI, in addition to the analyte ions, also excessive amounts of matrix ions are formed. These ions are also stored in the multipole ion guide and afterwards transferred into the ion trap using the ion transfer system. Since additional electric charges solely contribute to the space charge, it is advantageous to remove these, before they are even sent into the trap. For this process the multipole ion guide can also be used.

The widespread method of quadrupole mass spectrometry is based on the fact that ions in a "quadrupole filter" can be eliminated or "filtered out" by instable trajectories. The book "Quadrupole Mass Spectrometry" by Peter H. Dawson (Elsevier 1976) describes on pages 19–35 the operation of quadrupoles as mass filters. Although the filter properties of the higher multipoles (hexapole, octopole) are not as good as those of a quadrupole, the ions can be nevertheless filtered in these multipole ion guides. Particularly, elimination of small ions (below a predefined mass to charge ratio) can easily be achieved by selecting the applied high frequency amplitude.

Figure 4:
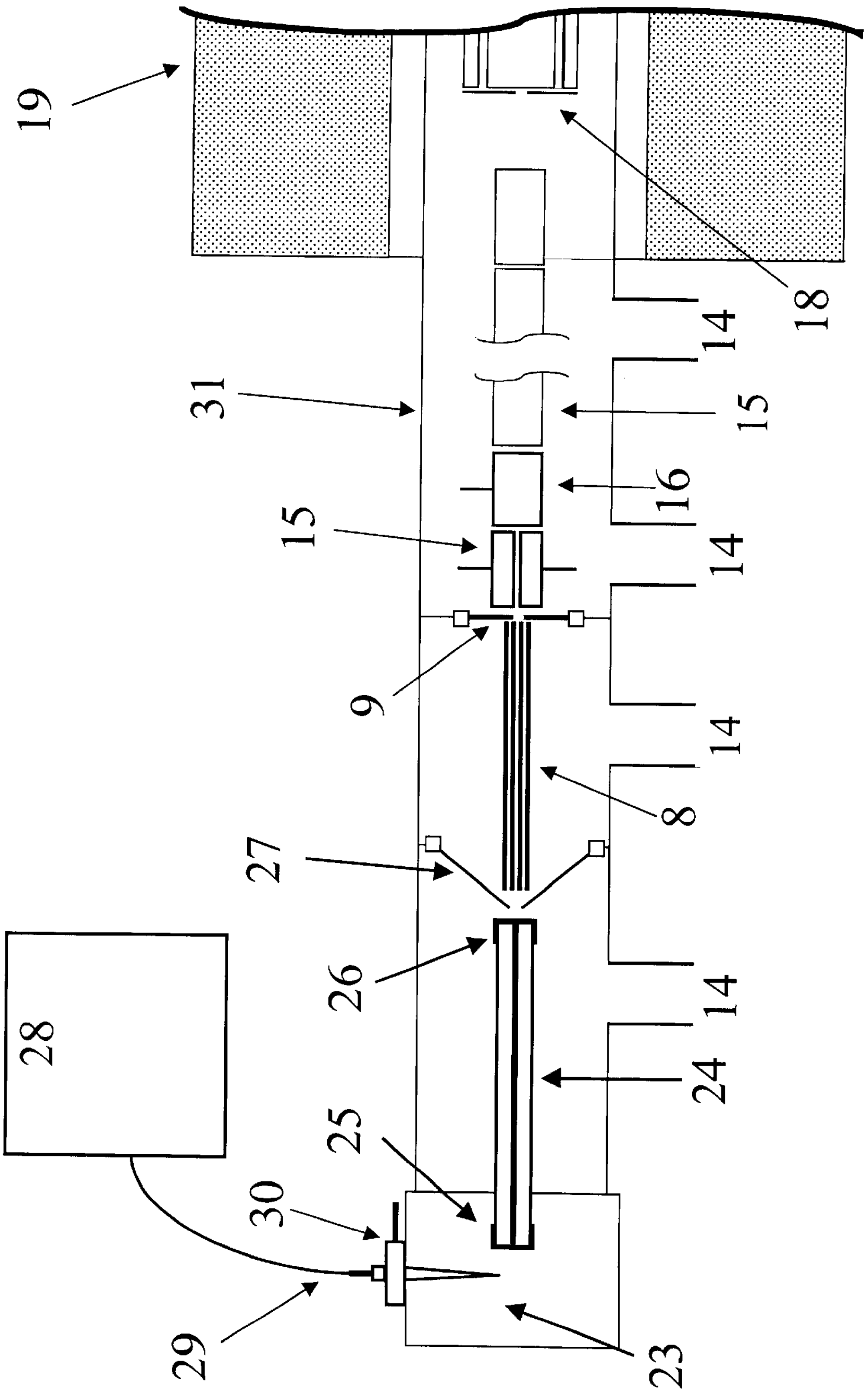
FIG. 4 shows a device for an FTICR mass spectrometer with an electrospray source and a liquid chromatograph. The components of the substance mixture which are separated by the chromatograph, are ionized in the electrospray ion source and transferred to a multipole ion guide with temporary storage capability. The pre-measurement of a defined subset of the temporarily stored ions allows the ion number regulation in the ICR trap.

FIG. 4 shows a setup containing an electrospray source with spray needle (nebulizer jet) (23) with the electrospray capillary (24) made of glass with metallized ends (25 and 26) and the skimmer (27). This source is connected (29) to a liquid chromatograph (28) generates ions for a Fourier transform ion cyclotron resonance mass spectrometer. The connection (30) of the nebulizer gas is in the carrier platform of the nebulizer jet (23). The vacuum system (31) is pumped differentially here. Each vacuum stage has separate pumping connections (14). The temporary storage and pre-measurement is performed analogous to the case with the LDI source from the storing multipole ion guide.

Since the electrospray source is driven continuously, the multipole ion guide is constantly refilled, while using a subset of extracted ions the pre-measurement is performed. However, the pre-measurement only takes a very short period of time, which remains in the microsecond region, so that the inaccuracy in calculating the number of ions based on the pre-measurement is negligible.

Figure 5:
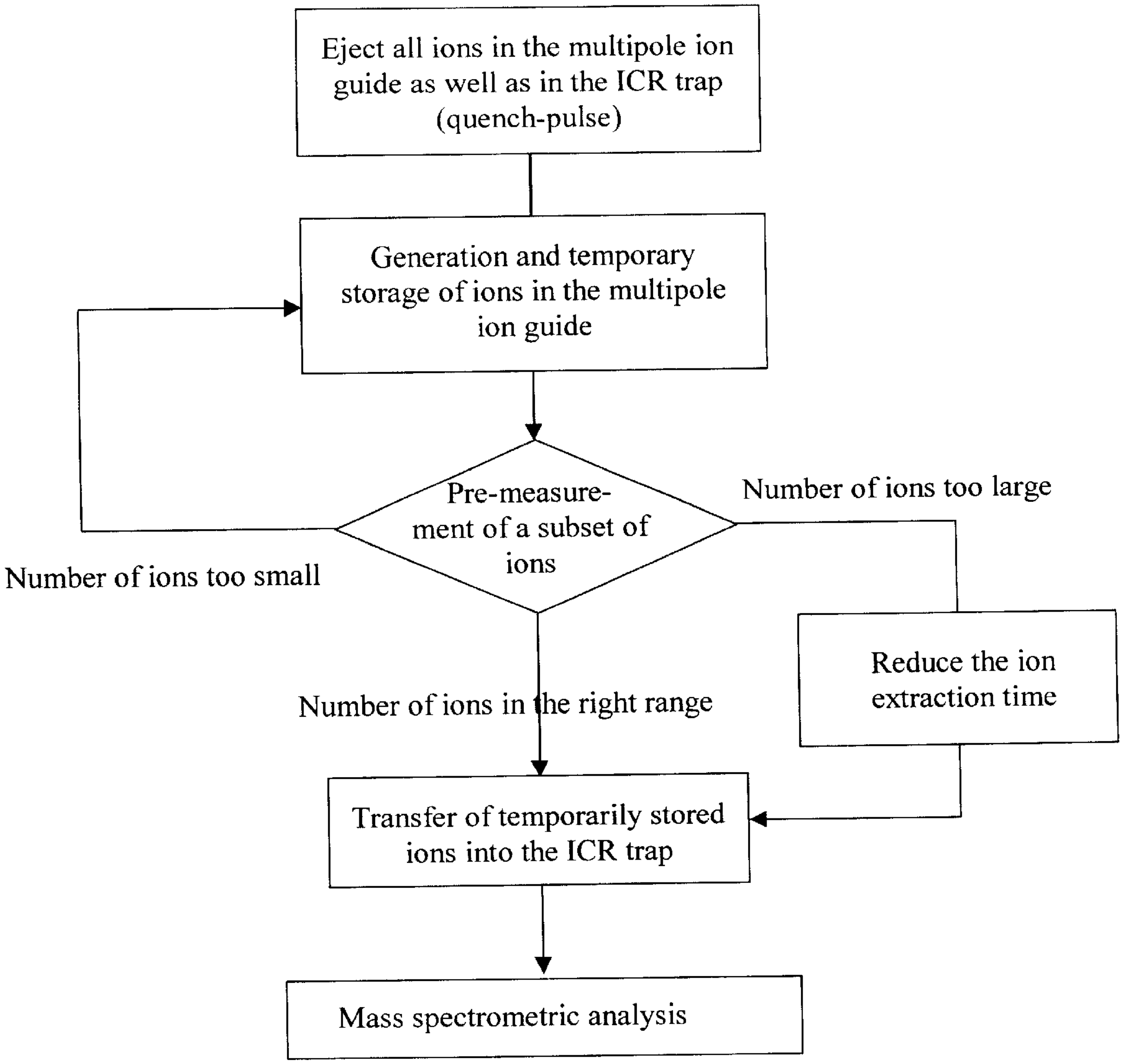
FIG. 5 schematically describes the algorithm of a procedure for the regulation of the number of the ions, that operates with temporary storage of the generated ions.

FIG. 5 shows an algorithm for the regulation procedure for filling the ICR trap with the desired number of ions. Ions are desorbed for example using a laser pulse and trapped in the multipole ion guide. A pre-measurement establishes if the number of ions in the multipole ion guide is in the range of tolerance. The number of ions has to be large enough to generate a mass spectrometric signal with a good signal-to-noise ratio, but not too large, that the undesirable space charge effects appear in the ion trap. If the number of ions is in the right range, the ion cloud in the temporary storage is transferred into the ion trap for mass spectrometric analysis. If the number of ions is too low, the laser is re-activated and the desorbed ions added to the ones already in the temporary storage. The pre-measurement may now indicate a number of ions, which is in the tolerance range. If not, the procedure is repeated. Ultimately the ions are transferred into the ion trap and analyzed mass spectrometrically. If, however, the pre-measurement indicates that the number of the temporarily stored ions is too high, only a certain amount of these ions can now be sent to the ion trap and analyzed there. For this purpose, the length of the ion extraction pulse is reduced according to a predefined algorithm. The calculated extraction pulse duration ensures that the number of ions transferred into the ion trap remains in the tolerable range. The connection between the extraction pulse length and the filling level can be determined experimentally.

It is also possible, what fraction of the temporarily stored ions of a "filling" is transferred into the ion trap. In this way, for example, quantitative statements can be made about the ions desorbed with each laser pulse, although probably not the complete amount of the desorbed ions has been analyzed.

A use of the multipole ion guide directly after the LDI or MALDI ionization as a pre-trap for ion storage, ion filtering and pre-measurement of the total ion charge will allow a complete control over the space charge effects in the trap. In the present invention, one of the most important points in measuring for controlling the number of ions is that not the complete amount of the temporarily stored ions is used. After a pre-measurement for determination of the number of temporarily stored ions, in case of the presence of a large quantity of ions, the remaining ions can be used for a larger number of mass spectrometric analyses in the ICR trap.

What is claimed is:

1. A method for controlling the filling of an ion trap of an ion cyclotron resonance mass spectrometer with a desired quantity of ions, the method comprising:

storing the ions in a multipole ion guide;

measuring a defined subset of the temporarily stored ions to determine an approximate filling level of the ion guide; and transferring at least a portion of the ions from the ion guide to the ion trap, a size of the transferred portion being determined from the measured approximate filling level.

2. A method as in claim 1 further comprising operating the multipole ion guide as a multipole mass filter to mass selectively filter the ions stored therein.

3. A method as in claim 1, wherein ions are desorbed directly into the storing multipole ion guide using a laser desorption ion source.

4. A method as in claim 1 further comprising filtering relatively light ions out of the ion guide.

5. A method as in claim 2 further comprising filtering relatively light ions out of the ion guide.

6. A method as in claim 3 further comprising filtering relatively light ions out of the ion guide.

7. A method as in claim 1, wherein the ions are formed by electrospray ionization and, prior to storage, are transferred through systems for removing solvent and reducing the ambient pressure of the ions.

8. A method as in claim 1, wherein determining an approximate filling level of the ion guide comprises transferring the subset of the ions to an electrical current detector.

9. A method as in claim 8, wherein the detector comprises a secondary electron multiplier.

10. A method as in claim 1, wherein determining an approximate filling level of the ion guide comprises transferring the subset of the ions to a second multipole, which is operated as a measuring electrode.

11. A method as in claim 1, wherein determining an approximate filling level of the ion guide comprises transferring the subset of the ions to the ion trap and performing a mass spectrometric measurement.

12. A method as in claim 1, wherein determining an approximate filling level of the ion guide comprises transferring the subset of the ions to the ion trap and performing an electrical total ion current measurement with the aid of the ion quench pulse at an electrode of the ion trap.

13. A method as in claim 1, wherein determining an approximate filling level of the ion guide comprises transferring the ions through the ion trap to an ion detector behind the trap.

14. A device for temporarily storing ions formed by laser desorption of a sample on a sample carrier plate, the device comprising:

a multipole ion guide located in front of the carrier plate;

an apertured end plate located to a side of the ion guide opposite the end plate;

a measurement apparatus for measuring a subset of the ions stored in the ion guide and determining an approximate filling level thereof; and a switchable potential supply electrically connected to the apertured plate, wherein the potential supply may be switched between a first potential that reflects the ions into the ion guide and a second potential that extracts the ions from the ion guide, a duration of the switching to the second potential being in response to the measured approximate filling level.

15. A device as in claim 14, wherein the measurement apparatus comprises a secondary electron multiplier.

16. A device as in claim 14, wherein the measurement apparatus comprises an ion detector located behind the ion trap, with which ions flying through the trap can be measured.

17. A device as in claim 14, wherein the measurement apparatus comprises a second multipole that is operated as a measuring electrode.

18. A device as in claim 14, wherein the measurement apparatus comprises a mass spectrometer.

19. A method as in claim 1 further comprising, after measuring a defined subset of the temporarily stored ions, adding ions to the ion guide if the approximate filling level is below a predetermined amount.

20. A device as in claim 14 further comprising an apparatus for adding additional ions to the ion guide if the approximate filling level is below a predetermined amount.

* * * * *